(12) United States Patent
Bierner et al.

(10) Patent No.: US 11,363,055 B2
(45) Date of Patent: Jun. 14, 2022

(54) SYSTEM AND METHODS FOR DYNAMIC CONTROLLED EVALUATION OF CLOUD SERVICE VULNERABILITIES

(71) Applicant: BANK OF AMERICA CORPORATION, Charlotte, NC (US)

(72) Inventors: Rachel Yun Kim Bierner, Los Angeles, CA (US); Caryn Ann Adams, Fort Mill, SC (US); Carol McGee Anthony, Brooklyn, NY (US); Sandra Mereos Crosswell, Frisco, TX (US); Georgeann Paschal Gregory, Denver, CO (US); Gerald Michael Kingsley, Charlotte, NC (US); Alexis Aron Lavi, Washington, DC (US); David Mortman, Worthington, OH (US); Rebbecca Danielle Nelson, Chicago, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 94 days.

(21) Appl. No.: 17/086,783

(22) Filed: Nov. 2, 2020

(65) Prior Publication Data
US 2022/0141246 A1 May 5, 2022

(51) Int. Cl.
*H04L 29/00* (2006.01)
*H04L 9/40* (2022.01)

(52) U.S. Cl.
CPC ........ *H04L 63/1433* (2013.01); *H04L 63/083* (2013.01)

(58) Field of Classification Search
CPC .......................... H04L 63/1433; H04L 63/083
See application file for complete search history.

(56) References Cited

U.S. PATENT DOCUMENTS

| | | |
|---|---|---|
| 8,407,800 B2 | 3/2013 | Schloegel et al. |
| 8,499,353 B2 | 7/2013 | Lockhart et al. |
| 8,806,619 B2 | 8/2014 | Lomont et al. |
| 9,256,746 B2 | 2/2016 | Toback et al. |
| 9,491,142 B2 | 11/2016 | Xie et al. |
| 9,767,290 B2 | 9/2017 | Murthy et al. |
| 9,805,202 B2 | 10/2017 | Medeiros et al. |
| 9,916,146 B2 | 3/2018 | Rioux |
| 9,946,880 B2 | 4/2018 | Lee et al. |
| 10,242,200 B1 | 3/2019 | Young |
| 10,360,062 B2 | 7/2019 | Lietz et al. |
| 10,445,502 B1 | 10/2019 | Desphande et al. |
| 10,489,789 B1 * | 11/2019 | Gerling-Ospina ...... H04L 67/20 |

(Continued)

*Primary Examiner* — Don G Zhao
(74) *Attorney, Agent, or Firm* — Moore & Van Allen PLLC; Nicholas C. Russell (57) ABSTRACT

Embodiments of the invention are directed to systems, methods, and computer program products for rapid assessment of cloud frameworks to evaluate those considered for use in an enterprise context. The invention may quickly and consistently identify gaps or weaknesses of cloud frameworks or resources, assess the potential negative impact of such gaps or weaknesses, and facilitate the communication of quantifiable data to responsible parties in order to facilitate the implementation of necessary controls or actions. Embodiments of the invention are highly adaptable and dynamic in fashion such that they can be quickly and easily updated based on the changing needs of the enterprise.

20 Claims, 7 Drawing Sheets

(56) References Cited

U.S. PATENT DOCUMENTS

| | | | |
|---|---|---|---|
| 10,536,478 B2 | 1/2020 | Kirti et al. | |
| 10,586,042 B2 | 3/2020 | Stopel et al. | |
| 10,623,325 B1 | 4/2020 | Pawlukowsky et al. | |
| 10,691,808 B2 | 6/2020 | Brucker et al. | |
| 10,706,145 B2 | 7/2020 | Stopel et al. | |
| 10,778,446 B2 | 9/2020 | Stopel et al. | |
| 2008/0209224 A1* | 8/2008 | Lord | H04L 63/0869 |
| | | | 713/185 |
| 2009/0006852 A1* | 1/2009 | Qiu | H04L 9/3226 |
| | | | 713/176 |
| 2016/0344747 A1* | 11/2016 | Link, II | H04W 12/06 |
| 2016/0371178 A1 | 12/2016 | Bishop et al. | |
| 2017/0357917 A1* | 12/2017 | Holmes | G06Q 10/1093 |
| 2017/0374032 A1 | 12/2017 | Woolward et al. | |
| 2019/0146969 A1* | 5/2019 | Kumar | H04L 9/3226 |
| | | | 434/362 |
| 2020/0042712 A1 | 2/2020 | Foo et al. | |
| 2020/0265138 A1* | 8/2020 | Shafet | G06F 21/54 |
| 2020/0329068 A1* | 10/2020 | Findlay | H04L 63/1433 |
| 2021/0390465 A1* | 12/2021 | Werder | H04L 63/104 |

\* cited by examiner

SYSTEM AND METHODS FOR DYNAMIC CONTROLLED EVALUATION OF CLOUD SERVICE VULNERABILITIES

FIELD

The present invention embraces a system for implementing a dynamic evaluation system within a technical enterprise environment.

BACKGROUND

Cloud service providers offer entities various services to including, but not limited to cloud computing, automation, storage, consulting, legal, real estate, communications, processing, and/or the like. Entities typically have to evaluate each service provider before onboarding them to ensure compliance with the standards and protocols of both the entity and industry standards. There is a need to establish a solution for implementing a cloud service evaluation framework within an enterprise environment that is easily accessible, dynamically updated, highly efficient in terms of resource demand, and has the ability to relay pertinent information to responsible parties for review in a quantifiable and standardized fashion.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address the above and/or other needs by providing a system for rapid assessment of cloud frameworks to evaluate those considered for use in an enterprise context. The invention may quickly and consistently identify gaps or weaknesses of cloud frameworks or resources, assess the potential negative impact of such gaps or weaknesses, and facilitate the communication of quantifiable data to responsible parties in order to facilitate the implementation of necessary controls or actions. Embodiments of the invention are highly adaptable and dynamic in fashion such that they can be quickly and easily updated based on the changing needs of the enterprise. The system and process of implementation generally comprises gathering and organizing relevant data related to the evaluated cloud services, loading data into a preconfigured database, development of code needed to implement conversion logic used to generate evaluation data, and packaging results for downstream review and further action.

In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for automation of bulk data conversion, generally comprising the steps of receive authentication credentials from a user device for user access to a shared datastore; in response to receiving authentication credentials, display a builder tool file and unlock tool file on the shared datastore; transmit the builder tool file or unlock tool file to the user device, wherein the builder tool file comprises instructions for presenting a graphical user interface on the user device; receive user input via the graphical user interface for use-case criteria; based on the user input, generate a service evaluation tool file in a locked permission format; receive the service evaluation tool file in locked format and display a second graphical user interface for unlock of the service evaluation tool file, wherein the second graphical user interface comprises entry fields for a passphrase; receive the passphrase via the second graphical user interface and transform the locked service evaluation tool file into an unlocked service evaluation tool file based on the passphrase.

In some embodiments, generating the service evaluation tool file further comprises: analyzing the use-case criteria to determine relevant tool criteria questions; altering program logic of a generation engine according to the relevant tool criteria questions; and automatically generating the service evaluation tool to include the relevant tool criteria questions.

In other embodiments, the program logic of the generation engine can be altered separately from the graphical user interface or the second graphical user interface.

In further embodiments, the unlocked service evaluation tool file further comprises an interface comprising multiple tabs, each tab comprising a separate graphical interface for review information of permissioned users.

In still further embodiments, the unlocked service evaluation tool displays a different subset of information based on a tiered passphrase scheme.

In some embodiments, the color scheme of the unlocked service evaluation tool file is automatically updated based on one or more responses provided via the locked service evaluation tool file.

Furthermore, the second graphical user interface may comprises a selectable option for converting an the locked service evaluation tool file or the unlocked service evaluation tool file into a different version format.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein. In accordance with embodiments of the invention, the term "user" may refer to an authorized person, business or the like, who utilizes an external apparatus such as a user device, for accessing systems and tools described herein. The external apparatus may be a user device (computing devices, mobile devices, smartphones, wearable devices, and the like). In some embodiments, the user may seek to perform one or more user activities using a web-based application accessed via the user device web browser or in some embodiments may perform one or more user activities using a locally stored application on the user device to interact with the system of the invention. In some embodiments, the user may perform a query by initiating a request for information from the entity systems or various databases using the user device to interface with the system to configure, test, or review system data conversions, tools, or ongoing conversion projects.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution.

A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user datastore that includes only personal information associated with the user, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like. In some embodiments, the graphical user interface may be presented in a different configuration depending on the user or type of user that accesses it. In some embodiments, the graphical user interface may be a component of a web-based application that the user may access remotely over a network or a secure virtual private network, secure socket layer, and the like.

Embodiments of the invention are directed to systems, methods, and computer program products for streamlining the processes involved with the conversion of large stores of data between multiple data management system components. The system is further configured to automate the performance of data review. Furthermore, the system is configured to automate the production of conversion code, launch command line interface on a user device, connect to target database components, retrieve necessary information, and automatically detect relational database management software capabilities and requirements. During the system processes, the system is designed to automatically performs pre-validation tasks and generate backup script files in chronological order.

Figure 1:
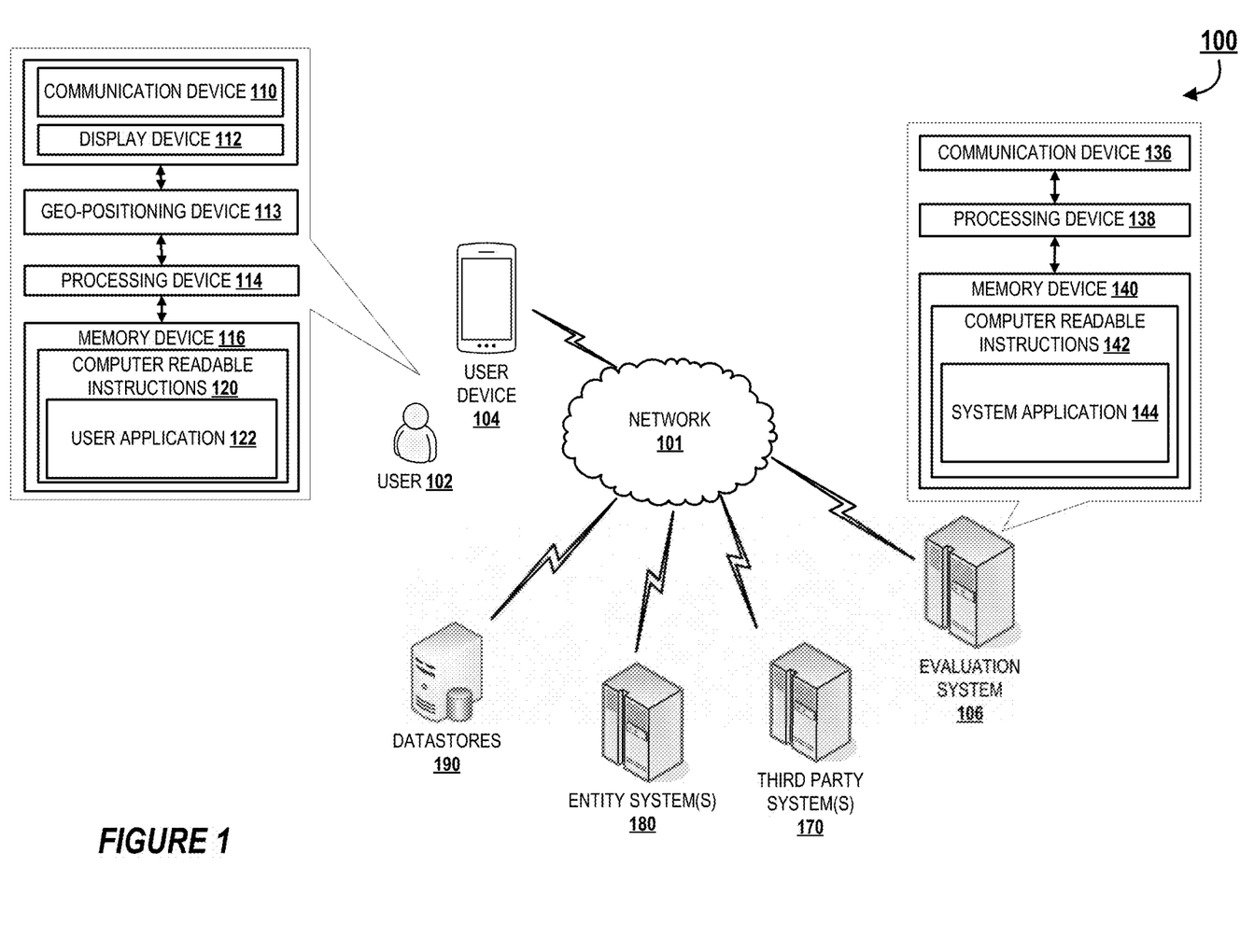
FIG. 1 depicts a platform environment 100 providing a system for evaluation of cloud service vulnerabilities, in accordance with one embodiment of the present invention.

FIG. 1 depicts a platform environment 100 providing a system for automated bulk data conversion, in accordance with one embodiment of the present invention. As illustrated in FIG. 1, an evaluation system 106 is configured for providing an application or web application interface accessible by a user 102 via user device 104. The evaluation system 106 is operatively coupled, via a network 101 to one or more user devices 104, to entity systems 180, datastores 190, and other external systems/third-party servers such as third party system(s) 170. In this way, the evaluation system 106 can send information to and receive information from multiple user devices 104 to provide an integrated platform and data access to a user 102. At least a portion of the system is typically configured to reside on the user device 104 (for example, at the user application 122), on the evaluation system 106 (for example, at the system application 144), and/or on other devices and systems such as the entity systems 180 and is a responsive system that facilitates execution of database configurations and version management of the evaluation system backend data. In some embodiments the system tools and functions are utilized by a database administrator in order to perform a data conversion of entity data provided by one or more entity system(s) 180, third party system(s) 170, or other systems not shown herein. In further embodiments, the database administrator may utilize tools and systems of the present invention in order to perform analysis or evaluation services, reporting services, data integration services, or the like.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the user 102 is an individual that wishes to conduct one or more activities with conversion system 106 using the user device 104. In some embodiments, the user 102 may access the evaluation system 106, and/or the entity system 180 through a user interface comprising a webpage or a user application. Hereinafter, "user application" is used to refer to an application on the user device 104 of the user 102, a widget, a webpage accessed through a browser, and the like. As such, in some instances, the user device may have multiple user applications stored/installed on the user device 104 and the memory device 116 in particular. In some embodiments, the user application is a user application 122, also referred to as a "user application" 122 herein, provided by and stored on the user device 104 by the evaluation system 106. In some embodiments the user application 122 may refer to a third party application or a user application stored on a cloud used to access the evaluation system 106 through the network 101. In some embodiments, the user application is stored on the memory device 140 of the evaluation system 106, and the user interface is presented on a display device of the user device 104, while in other embodiments, the user application is stored on the user device 104.

The user 102 may subsequently navigate through the interface, perform one or more searches for database information or initiate one or more activities or data conversions, inventories, or configurations using a central user interface provided by the user application 122 of the user device 104. In some embodiments, the user 102 may be routed to a particular destination using the user device 104. In some embodiments the user device 104 requests and/or receives additional information from the evaluation system 106 or the user device 104 for authenticating the user or the user device, determining appropriate queues, executing information queries, executing scripts, initiating reporting functions, and other system functions.

The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 180, datastores 190, and the evaluation system 106. As such, the communication device 110 generally comprises a modem, server, or other device for communicating with other devices on the network 101. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, system tools and functions, communicate with the evaluation system 106 to request or transmit information, initiate a data conversion, and/or view analytics data about completed or in-progress data conversions using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the user application 122, when executed by the processing device 114 are configured to cause the user device 104 and/or processing device 114 to perform one or more steps described in this disclosure, or to cause other systems/devices to perform one or more steps described herein.

As further illustrated in FIG. 1, the evaluation system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity systems 180, datastores 190, and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the evaluation system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices (such as the user device 104, the user application 122, and the like) to perform one or more steps described herein. In some embodiments, the memory device 140 includes a data storage for storing data related to user transactions and resource entity information, but not limited to data created and/or used by the system application 144. In the embodiment illustrated in FIG. 1, and described throughout much of this specification, a "system" configured for performing one or more steps described herein refers to the user application 122, that may perform one or more user activities either alone or in conjunction with the evaluation system 106, and specifically, the system application 144, and the like. It is understood that entity system(s) 180 and third party system(s) 170 may contain the same or similar communication, processing, memory, and application components and described herein with respect to conversion system 106. In some embodiments, the system application, a copy of the system application, or access to the system application may be stored on or otherwise provided as a service to entity system(s) 180 and third party system(s) 170 using said components. Additionally, it is understood that datastores 190 may represent data in some embodiments provided by or managed by each or all of the evaluation system 106, entity system 180, or third party system 170. In some embodiments access to retrieve or manipulate data from datastores 190 may be permissioned such that one or more entities may have differing levels of access and rights with respect to the data stored therein. For instance, conversion system 106 may have read and write permissions, while one or more third party system 170 may only have read-access. In other embodiments, users 102 within the entity systems 180, third party systems 170, and conversion 106 may have tiered, permissioned access as well (e.g., only certain, authorized users may access and manipulate data on conversion system 106 or datastore 190, or the like).

Figure 2:
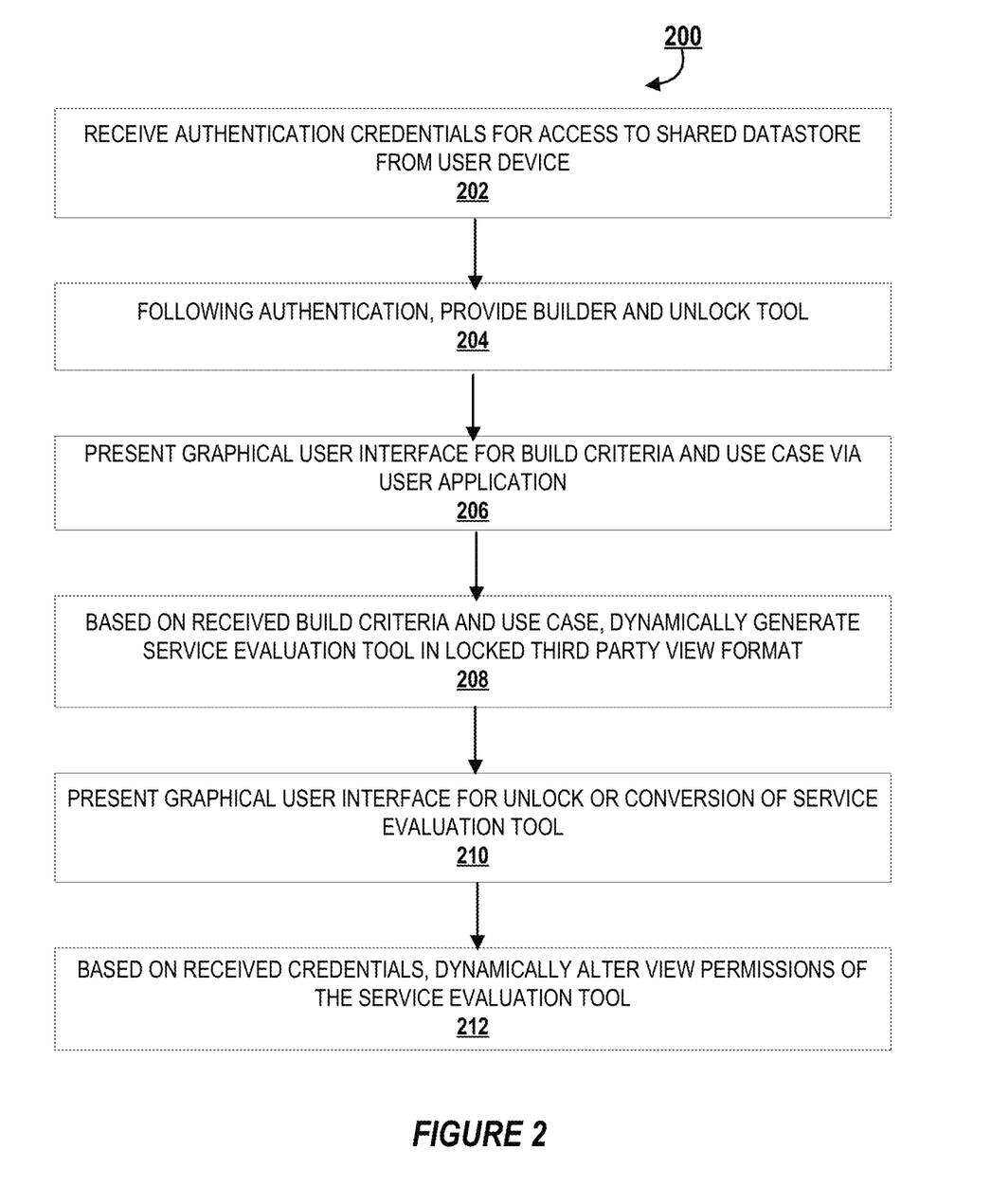
FIG. 2 illustrates a process flow for implementing a system for evaluation of cloud service vulnerabilities within a technical environment 200, in accordance with an embodiment of the invention.

FIG. 2 illustrates a process flow for implementing a system for evaluation of cloud service vulnerabilities within a technical environment 200, in accordance with an embodiment of the invention. As shown in block 202, the process begins whereby the system receives authentication credentials for access to the shared datastore 190 from the user device 104. Authorized users or user devices may be identified via the user entering certain authorization credentials (e.g., username, password, email address, pre-shared key, two-step authentication password token, or the like). In other embodiments, the shared datastore dashboard 301 may be hosted and its access controlled by entity systems 180, third party systems 170, or the like. As such, while the shared datastore dashboard may be hosted by a third party system 170, and stored on a remote datastore 190, access and permissions to the shared datastore dashboard 301 may be administered by entity systems 180. In some embodiments, users may be pre-authorized to access the shared datastore dashboard 301 by nature of their username or device ID (e.g., email address, static IP address, MAC address, hardware ID, or the like) being added to an authorized list managed by the entity systems 180. In other embodiments, any user may access the shared datastore by using a secure link shared by the entity systems 180 or a system administrator (e.g., the user is emailed a secure hyperlink which directs to the shared datastore dashboard 301 and which is required for access). In some embodiments, one or more of these secure access methods may be combined. For instance, the user may be required to access the shared datastore dashboard 301 via secure link, but may also be prompted to enter certain access credentials as described.

Figure 3:
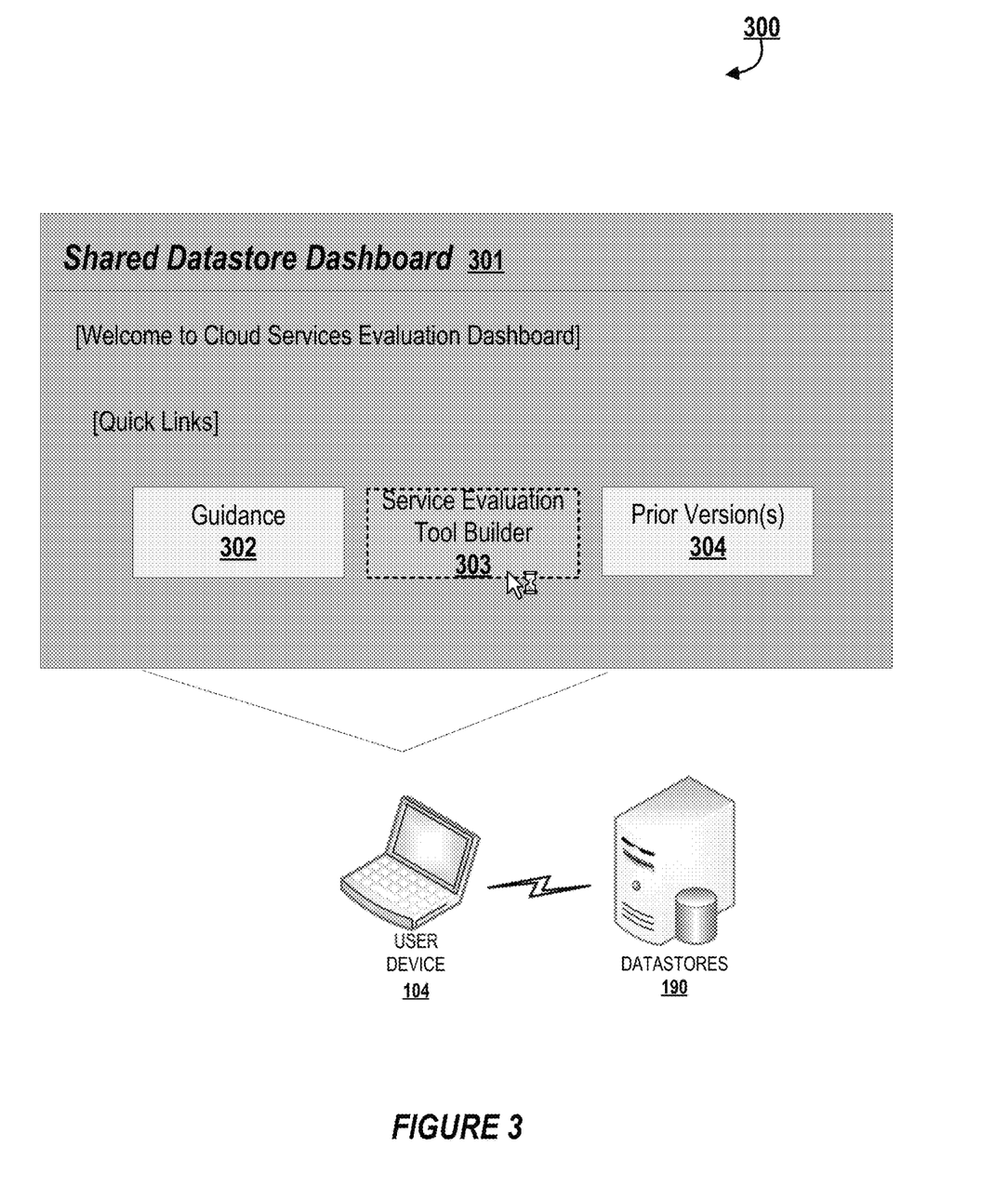
FIG. 3 depicts a graphical user interface 300 for a shared datastore dashboard allowing access to the evaluation tool, in accordance with an embodiment of the invention.

Next, following authentication of the user, the process proceeds to step 204, wherein the system provides a graphical user interface dashboard for a service evaluation builder tool or unlock tool, as shown in one embodiment in FIG. 3. In some embodiments, the service evaluation tool builder tool and unlock tool may be provided in the same dashboard or user interface, while in other embodiments, the user may be give an option to select which tool they would like to access. In some embodiments, each of these tools may comprise a separate file for download from the shared datastore 190, while in other embodiments, they may be combined within the same file and may be toggled by selecting tabs within the same file.

Figure 4:
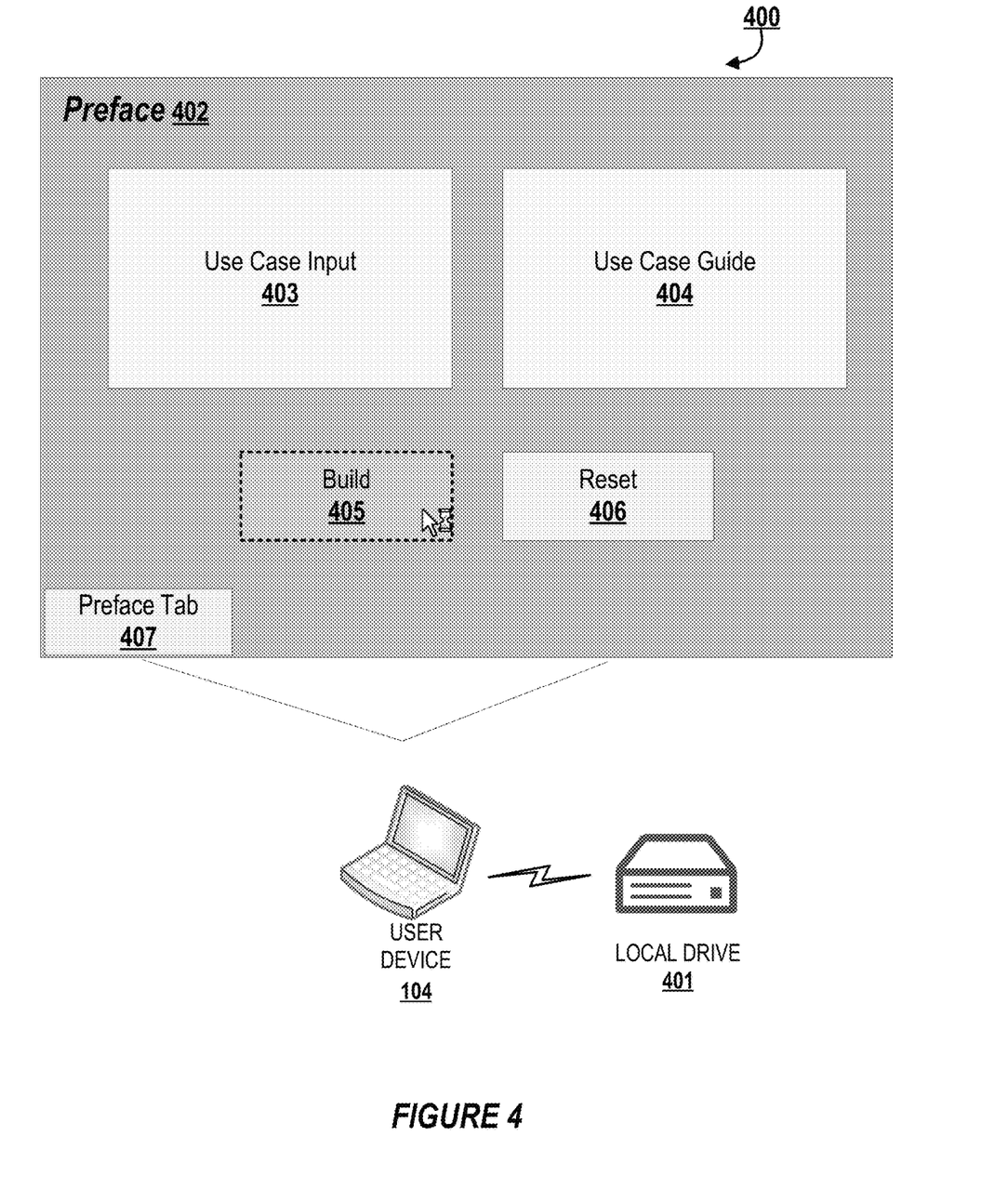
FIG. 4 depicts a graphical user interface 400 for a preface dashboard for building a tailored evaluation tool, in accordance with an embodiment of the invention.

Upon the user opening the service evaluation builder tool, the system presents a graphical user interface dashboard for guided creation of a use-case-specific service evaluation tool, as shown in one embodiment in FIG. 4. Use case may be delineated according to certain predefined classifications as programmed by a system administrator or architect (e.g., use cases for selection may include any number of cloud service classifications, including public proof of concept (POC), software as a service (SaaS), application programming interface (API), or the like). In some embodiments, a use-cases guideline list may also be provided at this juncture via the graphical user interface dashboard on the user device to aid the user in selection of the appropriate use-case for the service evaluation tool.

Figure 7:
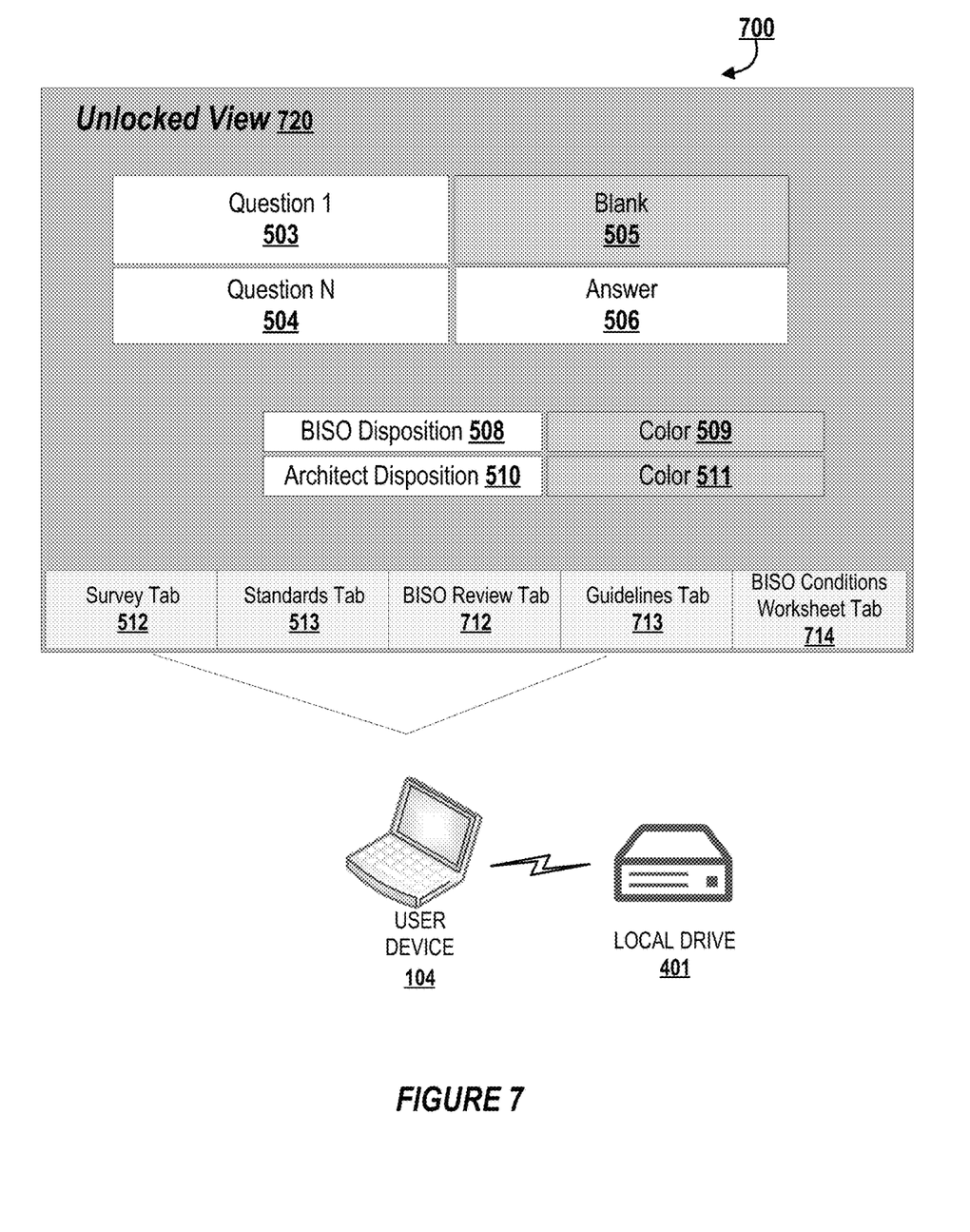
FIG. 7 depicts a graphical user interface 700 for an unlocked view of the evaluation tool, in accordance with an embodiment of the invention.

As shown in block 208, based on the received entries from the user regarding the use-case, the system automatically and dynamically generates a service evaluation tool in a locked third party or "vendor view" format. In this way, the system may access a library of predefined programming criteria for assembling the service evaluation tool file for the selected use case. In some embodiments, the service evaluation builder tool may automatically retrieve the programming criteria from the shared datastore 190, or from the evaluation system 106, via the network 101. In other embodiments, the service builder tool file itself may contain a locally stored programming criteria database. The programming criteria for each use case may differ according to the version or generation of the service evaluation tool selected by the user for download from the shared datastore 190. In this way, the programming criteria for populating and generating the resulting service evaluation tool file may be dynamically and seamlessly updated over time to adapt to new types of services, potential issues, topics for discussion, areas of interest, internal policies, industry best practices, or the like, in order to allow the service evaluation tool to stay up to date in a seamless manner without requiring intensive reprogramming or rebuilding of the interface itself. In addition, in some embodiments, previously generated service evaluation tool files may be upgraded or downgraded via a conversion tool presented to the user via the unlock tool dashboard, as shown in FIG. 7. In this way, service evaluation tool file may be reprogramed or repopulated with alternate information as the system retrieves differing programming criteria for structing the service evaluation tool file.

Figure 5:
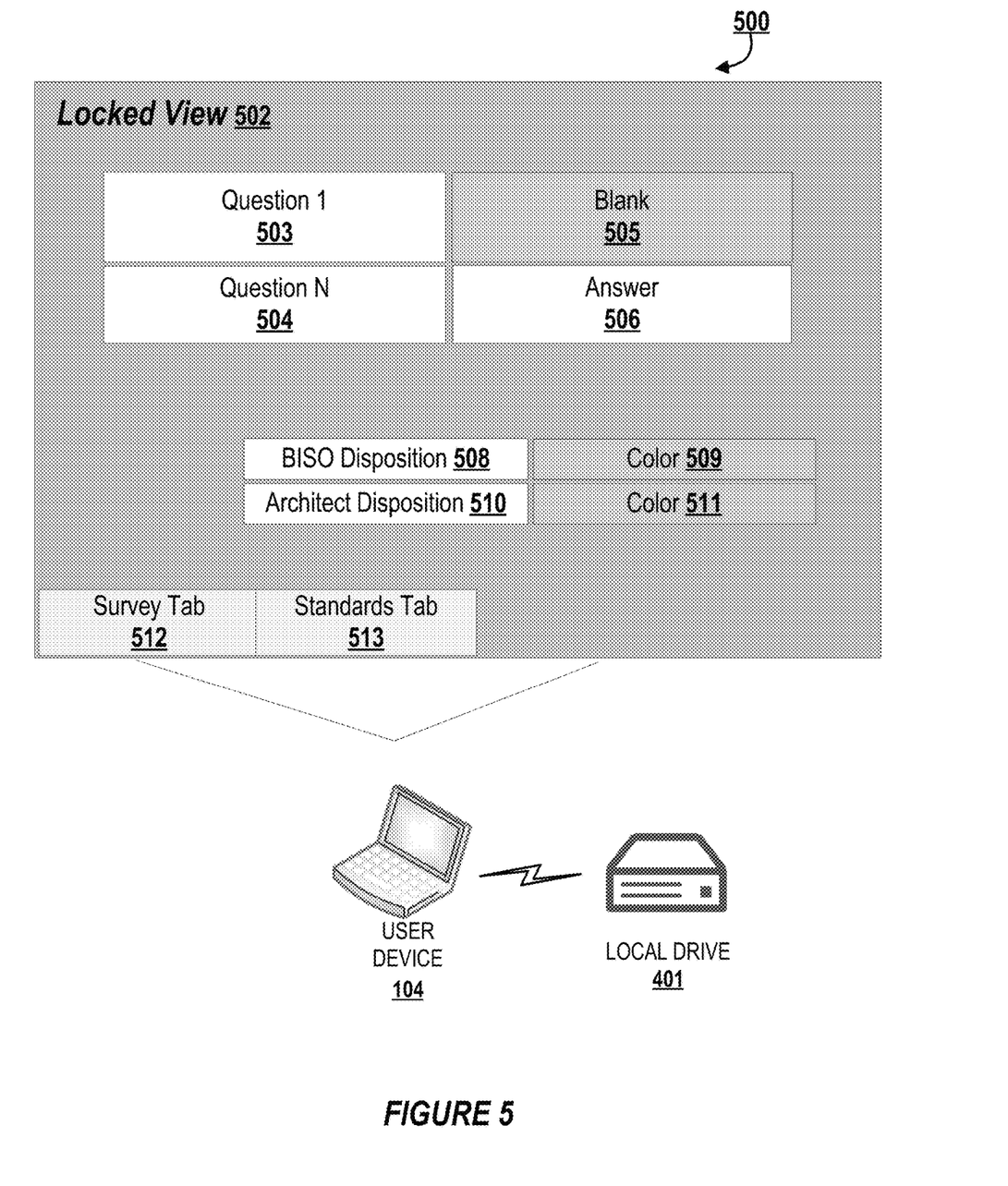
FIG. 5 depicts a graphical user interface 500 for a locked view dashboard, in accordance with an embodiment of the invention.

Once the service evaluation tool file has been generated in a locked view format, it may be shared with third parties or vendors. The vendors or third parties may view a limited version of the service evaluation tool in order to answer the pre-populated questions generated by the service evaluation builder tool according to the selected use case, as shown in FIG. 5. After the vendor or third party has completed the service evaluation tool by providing the requisite information or data, the vendor or third party may save the file and revert it back to the system for further processing. As such, the process may proceed to block 210, wherein a graphical user interface for unlocking or conversion of the service evaluation tool file is presented to the user, as shown in one embodiment in FIG. 6. Access to the unlocking or conversion interface may be provided in a permissioned fashion, wherein the user is required to enter a password, or the like, in order to manipulate the service evaluation file to unlock it (e.g., showing further information for review by an entity user), or convert it. In some embodiments, the service evaluation tool file may be unlocked in a tiered permission fashion, wherein some users may unlock some, but not all, of the information in the file, while other users may be granted full access based on their respective authorization criteria, such as their password, as shown in block 212 wherein the system dynamically alters the view permissions of the service evaluation tool, as shown in one embodiment in FIG. 7.

FIG. 3 depicts a graphical user interface 300 for a shared datastore dashboard allowing access to the evaluation tool, in accordance with an embodiment of the invention. As shown in FIG. 3, the shared datastore, such as datastore 190, may be operatively connected to a user device, such as the user device 104, via a network connection such as network 100 further described with respect to FIG. 1. The user device 104 may access the datastore 190 via the user application 122, which may comprise a web application, standalone application, API interface, or the like. In some embodiments, the shared datastore dashboard 301 may only be accessible to authorized user device(s) or users. Authorized users or user devices may be identified via the user entering certain authorization credentials (e.g., username, password, email address, pre-shared key, two-step authentication password token, or the like). In other embodiments, the shared datastore dashboard 301 may be hosted and its access controlled by entity systems 180, third party systems 170, or the like. As such, while the shared datastore dashboard may be hosted by a third party system 170, and stored on a remote datastore 190, access and permissions to the shared datastore dashboard 301 may be administered by entity systems 180. In some embodiments, users may be pre-authorized to access the shared datastore dashboard 301 by nature of their username or device ID (e.g., email address, static IP address, MAC address, hardware ID, or the like) being added to an authorized list managed by the entity systems 180. In other embodiments, any user may access the shared datastore by using a secure link shared by the entity systems 180 or a system administrator (e.g., the user is emailed a secure hyperlink which directs to the shared datastore dashboard 301 and which is required for access). In some embodiments, one or more of these secure access methods may be combined. For instance, the user may be required to access the shared datastore dashboard 301 via secure link, but may also be prompted to enter certain access credentials as described.

Once the user has gained access to the shared datastore dashboard 301, they are greeted by a graphical user interface with links to resources such as guidance 302, service evaluation tool builder 303, and prior version(s) 304. In some embodiments, clicking guidance 302 may direct the user to a page containing literature regarding the proper use of the tool builder, notes regarding updates or changes to the tool builder, notes from the administrator, common user errors to avoid, tips for system compatibility, a protocol for local storage of the tool builder, protocol for sharing the evaluation tool with third parties, or the like. By clicking the prior versions 304 tab, the user may view or access prior versions of the service evaluation tool builder (e.g., a third party or vendor may have completed a prior version of the evaluation tool which needs to be repaired, a system architect or administrator requires reference to a prior version of the evaluation tool, or the like). If the user clicks the service evaluation tool builder 303, they will be prompted to download the tool builder for local storage. In some embodiments, the tool builder file may be programmed such that it will only run from a secure local storage drive on the user device 104 (e.g., "H:\" drive only"). By opening the tool builder file, the user is given access to the preface dashboard as described in more detail in FIG. 4.

FIG. 4 depicts a graphical user interface 400 for a preface dashboard for building a tailored evaluation tool, in accordance with an embodiment of the invention. As shown, the preface dashboard is displayed as the user opens the service evaluation tool builder file, which may be stored and accessed on a local drive 401. In some embodiments, the service evaluation tool builder may be one of many file types, including, but not limited to, a spreadsheet workbook file (e.g., ".xlsx" ".xlst" ".xlsb" ".xltx" ".xml" or the like). After opening the builder tool file, the user is greeted with a preface 402 tab (noted near the bottom of the window as the preface tab 407), wherein the user may select use case input 403 according to the use case guide 404. Use case input 403 may include data input fields or drop down menus for various categories relating to or describing the cloud service to be evaluated (e.g., use case type, description of the use case, vendor name, internal entity case number, cloud service provider, line of business, highest data classification being stored or transmitted, business information security officer ("BISO") name, or the like). The user is aided in completing the use case input 403 fields by the use case guide 404, which may contain various definitions, examples, syntax requirements, or the like, related to the input fields of the use case input 403 (e.g., "SaaS=Vendor hosts application on a public cloud", or the like). At any time during or after the input process, the user may click reset 406 in order to clear the use case input 403 and restart the build process. Once the user is satisfied with the data entered in the user case input 403, the user may click the build 405 button, at which point the service evaluation tool builder will access a generation engine for generating the specific service evaluation tool file. In some embodiments, the generation engine is a set of program code designed to generate the specific service evaluation tool file based on the input use-case criteria and the generation engine is stored as part of the service evaluation tool builder file on the local user device 104. In other embodiments, the generation engine may reside remotely on the evaluation system 106, or may access a library of information either stored locally in the service evaluation tool builder file, or on evaluation system 106, in order to construct a locked evaluation tool for third party or vendor viewing, as shown in FIG. 5.

FIG. 5 depicts a graphical user interface 500 for a locked view dashboard, in accordance with an embodiment of the invention. The standard mode of the service evaluation tool after it is built by the service evaluation tool builder is the locked view, or "vendor" mode, wherein a user can securely fill out answers to questions populated by the service evaluation tool builder according the use input 403. As such, in the embodiment depicted in FIG. 5, the user device 104 may be the user device of a user or employee of the entity systems 180, or may be a third party user device of a user or employee of a vendor or third party system 170.

As depicted in FIG. 5, the locked view 502 includes question field, such as question 1 503, which may continue for any number of questions to question N 504. To the right of the question fields are the answer fields, such as blank 505 and answer 506. In some embodiments, the answer fields may comprise a drop down menu for selectin of pre-populated answers, while others may be general input fields for descriptive responses. As shown, answer fields left blank, such as blank 505, may be shaded or colored to indicate that the question has not been responded to by the vendor or third party, or that the like. As such, the service evaluation tool is programmed to automatically detect when an answer has been input, and automatically respond by changing the shade or color of the answer field to facilitate ease of review by the user.

Toward the bottom of the locked view 502, two tabs are shown, survey tab 512, and standards tab 513. The standards tab 513 may contain helpful information to guide the user in completing the service evaluation tool, while the survey tab directs the user to the locked view 502. In some embodiments, even though an answer field may have been populated, the service evaluation tool may intelligently recognize that the answer is not adequate (e.g., incorrect formatting, syntax, length, or the like), and may shade or color the answer field. In some embodiments, the user may be directed to the standards tab 513 for more information on how to remedy such errors.

Also shown in FIG. 5 are BISO disposition 508, architect disposition 510, and corresponding color fields 509 and 511, respectively. Following a third party of vendor completing the service evaluation tool, the file may be saved and transmitted to a user of the entity systems 180, such as the BISO or administrator, or "architect", for further review and criteria scoring. As the particular service evaluation tool is reviewed by a BISO or an architect, the these field may change color according to the service evaluation tool program logic. For instance, if the BISO has reviewed the vendor responses in their entirety and provided scoring criteria for all responses, the color 509 may be a certain shade or color, while color 511 may be a different shade or color if it has not yet been completed by the architect. By clicking the color 509 or 511, the user may be directed to a view of the incomplete fields, the completed review, or an access and conversion dashboard as depicted in FIG. 6.

Figure 6:
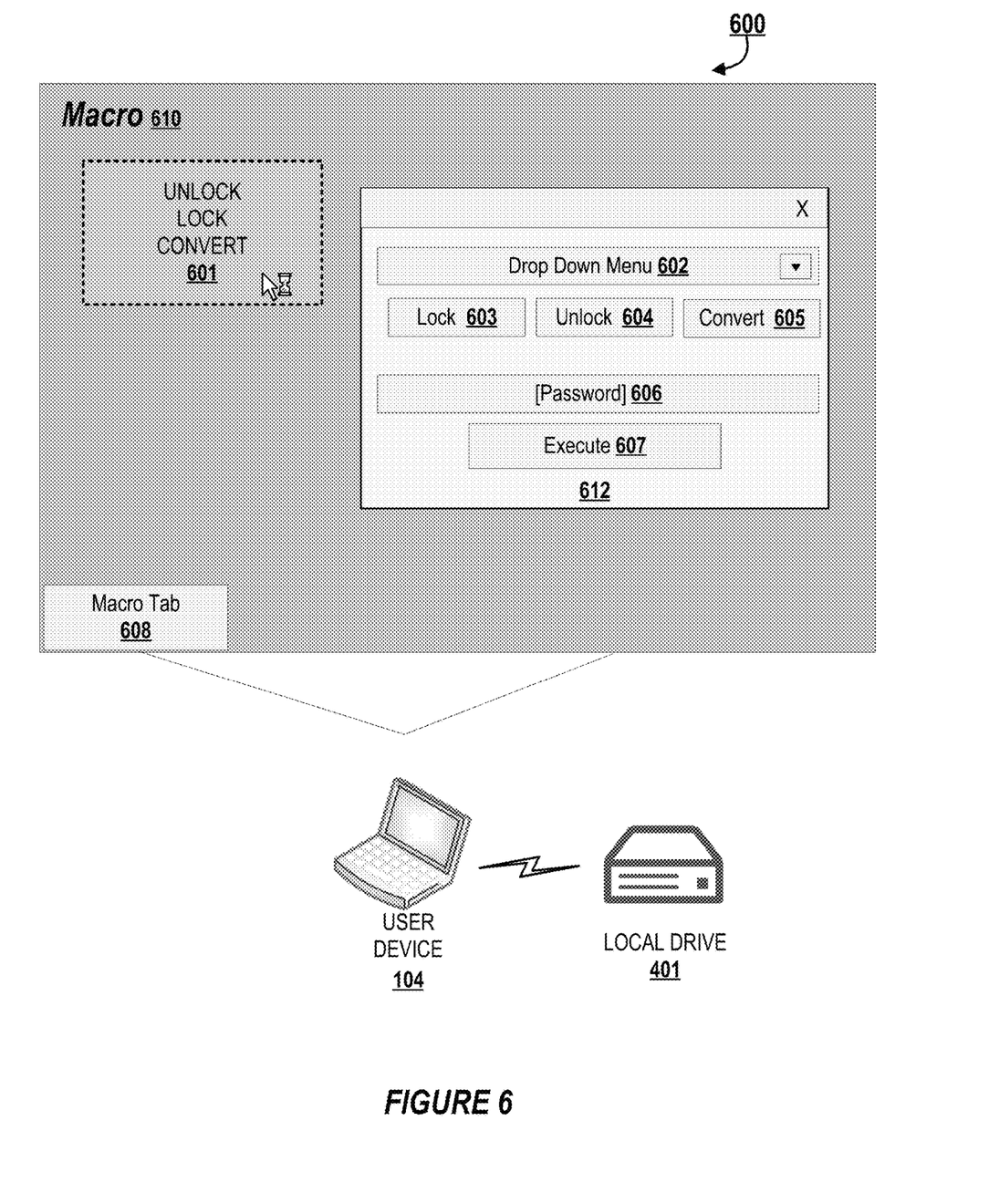
FIG. 6 depicts a graphical user interface 600 for service evaluation tool access and conversion, in accordance with an embodiment of the invention.

FIG. 6 depicts a graphical user interface 600 for service evaluation tool access and conversion, in accordance with an embodiment of the invention. In some embodiments, access and conversion of the service evaluation tool file may be handled separately by an additional file or program stored on the local drive 401 of a user device 104 belonging to the entity or authorized for use by a particular user, such as a BISO or architect user. In some embodiments, the access and conversion file or program may be one of many file types, including, but not limited to, a spreadsheet workbook file (e.g., ".xlsx" ".xlst" ".xlsb" ".xltx" ".xml" or the like). The access and conversion tool file may be accessed via the shared datastore 190 in some embodiments, in the same or similar fashion as authorized access to the services evaluation tool builder file is provided. In other embodiments, access and conversion of the service evaluation file may be embedded within the service evaluation tool file, on a separate tab, sheet, or the like, such as the macro tab 608. Upon opening the access and conversion file, the user is greeted with a macro 610 dashboard. In some embodiments, such as the embodiment depicted in FIG. 6, macro 610 dashboard comprises an unlock, lock, convert 601 button, which the user may click in order to access the window 612 shown on the right hand side of the macro 610 dashboard. The user is shown, via the graphical user interface, a drop down menu 602, selection buttons for lock 603, unlock 604, and convert 605. In some embodiments, the drop down menu 602 may be utilized to locate a specific service evaluation tool file for locking, unlocking or conversion, wherein the file may be stored locally on the user device 104 or on datastore 190. In order to lock, unlock, or convert the service evaluation tool file, the user is prompted to enter a password in the password 606 field, at which point the user may click the unlock 607 button in order to execute the desired action.

In some embodiments, a universal password is shared between authorized users in order to gain access privileges to the lock, unlock, and convert functions. In further embodiments, the password may be user-specific, or user-type-specific, such that a different password may yield tiered privileges to some, but not all, functions (e.g., a BISO user may be given a password to lock or unlock files, while conversion may only be completed by an architect user). In other embodiments, the results of an unlocked file may differ based on the user permissions well (e.g., a BISO unlocked file may show less information than an architect unlocked file, as determined by the password entered).

FIG. 7 depicts a graphical user interface 700 for an unlocked view of the evaluation tool, in accordance with an embodiment of the invention. Following entry of the password in the password 606 field and clicking the execute 607 button, the user is automatically presented with an unlocked view 720 dashboard which contains additional information about the service evaluation tool file which was chosen in the drop down menu 602. The additional information may be stored in the service evaluation tool file itself, but only shown when the file has been unlocked by a user with the requisite permission level. For instance, as shown on the tabs toward the bottom of the unlocked view 720, additional information may include the survey tab 512, the standards tab 513, BISO review tab 712, guidelines tab 713, and BISO conditions worksheet tab 714.

By clicking any of the tabs included in the unlocked view 720, the user may be presented with additional information for review of the vendor or third party responses provided on the service evaluation tool. For instance, the BISO review tab 712 may direct the user to a dashboard where the questions and answers of the vendor and third party are shown along with additional fields for entry of criteria and scoring information by the BISO user. The BISO user may reference information in the standards tab 513 (e.g., to review instructions given to the vendor or third party to diagnose or interpret an incompatible answer in terms of syntax, terminology, or the like), may access the guidelines tab (e.g., in order to reference the scoring criteria guidelines for review, or the like), or may access the BISO conditions worksheet tab 714 (e.g., to view a summary of required conditions entered by the BISO regarding potential onboarding of the service being evaluated). Also shown in FIG. 7 are the BISO disposition 508 and the architect disposition 510, which, as discussed with regard to FIG. 5, provide a quick visual indication of whether or not the review of the service evaluation has been completed by the BISO or the architect, or may indicate to the vendor or third party that there are items that need addressing. In addition, in the unlocked view, the color 509 and 511 buttons may direct the user to the BISO review tab or the BISO conditions worksheet tab in order to provide a summary of incomplete, rejected, or "needs addressing" fields as provided by the BISO or architect. In the locked view, such as shown in FIG. 5, clicking the color buttons 509 and 511 may simply distill the information shown in the question fields to the information requiring their attention, or direct the user to a separate tab where the distilled information is shown and linked back to the survey tab.

In some embodiments, the unlocked view may contain additional tabs only accessible to the architect, or a user with the highest permission level for unlocking the service evaluation tool file, such as an "architect review" tab. The architect review tab may contain still further information entry fields as compared to the BISO review tab where the architect can comment on, change, alter, or agree with the BISO review criteria. Decisions to pass, fail, or flag vendor or third party responses, or to agree or disagree with the BISO review, may be automatically populated from the architect review tab to the BISO review tab for viewing by the BISO in their unlocked view embodiment. In some embodiments, options that the BISO or architect may select in terms of review criteria may include a tiered scoring structure. For instance, a score 3 may indicate an optimal question response by the vendor or third party. A score 2 may indicate that the question response is acceptable, but discussion of a more optimal choice may be suggested for addressing with the vendor or third party (e.g., a score 2 may also prompt the BISO or architect to enter notes in a separate annotation section linked to the specific question and shown on the BISO review tab, or the like). For instance, a score of 2 may not cause the question to be labeled as a "fail", but a better practice may be recommended. In some embodiments, potential discussion points may be included in the guidelines tab 713. Finally, a score 1 may indicate that a question response from the vendor or third party presents an issue that must be remediated. Issues involving a score 1 or 2 may in some cases be labeled "pass with conditions," however, conditions must be documented with vendor's reasoning, timing, or the like, and noted in the BISO conditions worksheet tab 714 for later review in case of audit. Escalation of issues may also be achieved by packaging the service evaluation tool file for sharing with outside teams of the entity systems 180.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A system for dynamic controlled evaluation of cloud service vulnerabilities, the system comprising:
at least one memory device with computer-readable program code stored thereon;
at least one communication device;
at least one processing device operatively coupled to the at least one memory device and the at least one communication device, wherein executing the computer-readable program code is configured to cause the at least one processing device to:
receive authentication credentials from a user device for user access to a shared datastore;
in response to receiving authentication credentials, display a builder tool file and unlock tool file on the shared datastore;
transmit the builder tool file or unlock tool file to the user device, wherein the builder tool file comprises instructions for presenting a graphical user interface on the user device;
receive user input via the graphical user interface for use-case criteria;
based on the user input, generate a service evaluation tool file in a locked permission format;
receive the service evaluation tool file in locked format and display a second graphical user interface for unlock of the service evaluation tool file, wherein the second graphical user interface comprises entry fields for a passphrase;
receive the passphrase via the second graphical user interface and transform the locked service evaluation tool file into an unlocked service evaluation tool file based on the passphrase.

2. The system of claim 1, wherein generating the service evaluation tool file further comprises:
analyzing the use-case criteria to determine relevant tool criteria questions;
altering program logic of a generation engine according to the relevant tool criteria questions; and
automatically generating the service evaluation tool to include the relevant tool criteria questions.

3. The system of claim 2, wherein the program logic of the generation engine can be altered separately from the graphical user interface or the second graphical user interface.

4. The system of claim 1, wherein the unlocked service evaluation tool file further comprises an interface comprising multiple tabs, each tab comprising a separate graphical interface for review information of permissioned users.

5. The system of claim 1, wherein the unlocked service evaluation tool displays a different subset of information based on a tiered passphrase scheme.

6. The system of claim 1, wherein the color scheme of the unlocked service evaluation tool file is automatically updated based on one or more responses provided via the locked service evaluation tool file.

7. The system of claim 1, wherein the second graphical user interface further comprises a selectable option for converting an the locked service evaluation tool file or the unlocked service evaluation tool file into a different version format.

8. A computer program product for dynamic controlled evaluation of cloud service vulnerabilities, the computer program product comprising a non-transitory computer-readable storage medium having computer-executable instructions to:
receive authentication credentials from a user device for user access to a shared datastore;
in response to receiving authentication credentials, display a builder tool file and unlock tool file on the shared datastore;
transmit the builder tool file or unlock tool file to the user device, wherein the builder tool file comprises instructions for presenting a graphical user interface on the user device;
receive user input via the graphical user interface for use-case criteria;
based on the user input, generate a service evaluation tool file in a locked permission format;
receive the service evaluation tool file in locked format and display a second graphical user interface for unlock of the service evaluation tool file, wherein the second graphical user interface comprises entry fields for a passphrase;
receive the passphrase via the second graphical user interface and transform the locked service evaluation tool file into an unlocked service evaluation tool file based on the passphrase.

9. The computer program product of claim 8, wherein generating the service evaluation tool file further comprises:
analyzing the use-case criteria to determine relevant tool criteria questions;
altering program logic of a generation engine according to the relevant tool criteria questions; and
automatically generating the service evaluation tool to include the relevant tool criteria questions.

10. The computer program product of claim 9, wherein the program logic of the generation engine can be altered separately from the graphical user interface or the second graphical user interface.

11. The computer program product of claim 8, wherein the unlocked service evaluation tool file further comprises an interface comprising multiple tabs, each tab comprising a separate graphical interface for review information of permissioned users.

12. The computer program product of claim 8, wherein the unlocked service evaluation tool displays a different subset of information based on a tiered passphrase scheme.

13. The computer program product of claim 8, wherein the color scheme of the unlocked service evaluation tool file is automatically updated based on one or more responses provided via the locked service evaluation tool file.

14. The computer program product of claim 8, wherein the second graphical user interface further comprises a selectable option for converting an the locked service evaluation tool file or the unlocked service evaluation tool file into a different version format.

15. A computer implemented method for dynamic controlled evaluation of cloud service vulnerabilities, the computer implemented method comprising:
providing a computing system comprising a computer processing device and a non-transitory computer readable medium, where the non-transitory computer readable medium comprises configured computer program instruction code, such that when said instruction code is operated by said computer processing device, said computer processing device performs the following operations:
receiving authentication credentials from a user device for user access to a shared datastore;
in response to receiving authentication credentials, displaying a builder tool file and unlock tool file on the shared datastore;
transmitting the builder tool file or unlock tool file to the user device, wherein the builder tool file comprises instructions for presenting a graphical user interface on the user device;
receiving user input via the graphical user interface for use-case criteria;
based on the user input, generating a service evaluation tool file in a locked permission format;
receiving the service evaluation tool file in locked format and display a second graphical user interface for unlock of the service evaluation tool file, wherein the second graphical user interface comprises entry fields for a passphrase;
receiving the passphrase via the second graphical user interface and transform the locked service evaluation tool file into an unlocked service evaluation tool file based on the passphrase.

16. The computer implemented method of claim 15, wherein generating the service evaluation tool file further comprises:
analyzing the use-case criteria to determine relevant tool criteria questions;
altering program logic of a generation engine according to the relevant tool criteria questions; and
automatically generating the service evaluation tool to include the relevant tool criteria questions.

17. The computer implemented method of claim 16, wherein the program logic of the generation engine can be altered separately from the graphical user interface or the second graphical user interface.

18. The computer implemented method of claim 15, wherein the unlocked service evaluation tool file further comprises an interface comprising multiple tabs, each tab comprising a separate graphical interface for review information of permissioned users.

19. The computer implemented method of claim 15, wherein the color scheme of the unlocked service evaluation tool file is automatically updated based on one or more responses provided via the locked service evaluation tool file.

20. The computer implemented method of claim 15, wherein the second graphical user interface further comprises a selectable option for converting an the locked service evaluation tool file or the unlocked service evaluation tool file into a different version format.

* * * * *